(12) United States Patent
Keene

(10) Patent No.: US 11,783,464 B2
(45) Date of Patent: Oct. 10, 2023

(54) INTEGRATING EXTENDED REALITY WITH INSPECTION SYSTEMS

(71) Applicant: Lawrence Livermore National Security, LLC, Livermore, CA (US)

(72) Inventor: Lionel Keene, Livermore, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 0 days.

(21) Appl. No.: 15/984,204

(22) Filed: May 18, 2018

(65) Prior Publication Data
US 2019/0355111 A1 Nov. 21, 2019

(51) Int. Cl.
*G06T 7/00* (2017.01)
*G06T 19/00* (2011.01)
*G06V 20/20* (2022.01)

(52) U.S. Cl.
CPC .......... *G06T 7/0004* (2013.01); *G06T 19/006* (2013.01); *G06V 20/20* (2022.01)

(58) Field of Classification Search
CPC . G06T 7/0004; G06T 19/006; G06T 345/633; G06K 9/0067; G06K 9/00671; G01N 29/24; G01N 29/44; G01N 29/262; G01N 29/225; G01N 27/902; G01N 2021/8893; G02B 27/01; G02B 27/017; G05B 2219/32014
See application file for complete search history.

(56) References Cited

U.S. PATENT DOCUMENTS

| 8,398,541 | B2* | 3/2013 | DiMaio | A61B 34/10 600/111 |
| 9,316,619 | B2* | 4/2016 | Lombardo | G01N 27/902 |
| 10,018,465 | B2* | 7/2018 | Groninger | G01N 27/90 |
| 10,345,221 | B1* | 7/2019 | Silverman | G01N 29/28 |
| 10,564,127 | B2* | 2/2020 | Babcock, IV | G01N 17/006 |
| 2007/0238981 | A1* | 10/2007 | Zhu | A61B 90/36 600/424 |
| 2011/0088476 | A1* | 4/2011 | Yamano | G01N 29/043 73/632 |
| 2013/0237811 | A1* | 9/2013 | Mihailescu | A61B 8/4438 600/424 |
| 2015/0039245 | A1* | 2/2015 | Langlois | G01N 29/043 702/39 |
| 2015/0122055 | A1* | 5/2015 | Puckett | G01N 27/90 73/865.8 |
| 2015/0301596 | A1* | 10/2015 | Qian | G06F 3/013 345/633 |

(Continued)

*Primary Examiner* — Chante E Harrison
(74) *Attorney, Agent, or Firm* — Perkins Coie LLP

(57) ABSTRACT

An extended reality ("XR") inspection system for inspecting a target is provided. The XR inspection system includes an inspection system and an XR device. The inspection system includes an inspection main unit and an inspection probe. The inspection main unit collects inspection data from the inspection probe, receives commands input by an inspector using the XR device, performs functions associated with the commands, and sends display data to the XR device. The XR device provides an augmented reality display and sensors. The XR device displays display data received from the inspection main unit, receives commands via the sensors from the inspector, and sends the commands to the inspection main unit.

30 Claims, 7 Drawing Sheets

(56) References Cited

U.S. PATENT DOCUMENTS

| | | | |
|---|---|---|---|
| 2015/0339858 A1* | 11/2015 | Nakamura | G06T 19/006 345/633 |
| 2016/0048964 A1* | 2/2016 | Kruglick | G06F 3/013 382/103 |
| 2016/0103221 A1* | 4/2016 | Oh | G01S 15/8993 73/628 |
| 2016/0284079 A1* | 9/2016 | Persely | G06T 19/006 |
| 2016/0327520 A1* | 11/2016 | Ten Grotenhuis | G01S 7/52079 |
| 2017/0258526 A1* | 9/2017 | Lang | A61B 17/155 |
| 2018/0168781 A1* | 6/2018 | Kopelman | G16H 50/50 |
| 2018/0304467 A1* | 10/2018 | Matsuura | B25J 9/1692 |
| 2018/0344286 A1* | 12/2018 | Mienkina | A61B 8/4427 |
| 2018/0369038 A1* | 12/2018 | Bhimavarapu | G16H 40/63 |
| 2019/0056693 A1* | 2/2019 | Gelman | G02B 27/017 |
| 2019/0096135 A1* | 3/2019 | Dal Mutto | G06K 9/6257 |
| 2019/0239850 A1* | 8/2019 | Dalvin | A61B 8/462 |
| 2019/0392654 A1* | 12/2019 | Sato | G05B 23/0216 |
| 2020/0064821 A1* | 2/2020 | Sato | G02B 27/017 |
| 2020/0065585 A1* | 2/2020 | Sato | G06T 7/0004 |
| 2020/0107002 A1* | 4/2020 | Casas | H04N 13/156 |
| 2020/0302592 A1* | 9/2020 | Ebersohn | G06T 7/0004 |

* cited by examiner

INTEGRATING EXTENDED REALITY WITH INSPECTION SYSTEMS

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

The nondestructive testing or inspection of many different types of systems and the components of those systems in various industries is critical to maintaining the proper operation of those systems. For example, in the energy industry, these components include generators, containment vessels, pipes, turbines, and so on. In the transportation industry, these systems include bridges, roadway support structures, engine housings, wing structures, fuselages, vehicle launch platforms, and so on. In the manufacturing industry, these components include holding tanks, conveyors, pipes, motors, lasers, industrial robots, and so on. The inspection of these components often has the goal of identifying defects in the components so that corrective action can be taken in a way that minimizes the impact of the defects. For example, if a hairline fracture in a pipe or a containment vessel or a stress fracture in a rotor blade can be identified and corrective action taken, then the problems associated with the impending failure of the pipe or rotor blade can be mitigated.

A variety of inspection tools are available to assist inspectors in performing the inspection of such components. These inspection tools or units typically include an inspection main unit and an inspection probe. An inspection probe collects measurements of the target component ("target") that is being inspected and provides those measurements to the inspection main unit for storage and analysis. For example, an inspection probe may transmit electromagnetic or acoustic signals and collect returned signals as the inspection probe is moved by the inspector across a target. The inspection probe provides information on the returned signals, referred to as measurements, to the inspection main unit for storage.

A Phased Array Ultrasonic Testing ("PAUT") unit is an example of an inspection system that is used widely in various industries. The inspection main unit of a PAUT unit typically includes a processing unit, a memory unit, a display unit, one or more input units (e.g., touch screen, keyboard, and dials), an inspection probe interface, and an external system interface. The processing unit executes an inspection program for controlling inspections using the inspection probe. The inspection program may send instructions to the inspection probe that control the transmitting of signals to and the collecting of signals from a target and then store the collected signals as inspection data. The inspection probe serves as a transceiver that sends ultrasonic energy to the target, receives the reflected energy, and sends an indication of the received reflected energy to the inspection main unit. The inspection program also displays measurements derived from the inspection data, provides alerts to the inspector (e.g., redo a scan), displays information relating to the scan plan for an inspection, and so on. The inspection program may allow the inspector to control the inspection, such as by adjusting a gain setting, setting an ultrasonic wave intensity, setting pulse timing, establishing a beam angle, adjusting screen resolution, and so on. The inspection probe interface may provide for a wired or wireless connection to the inspection probe. For example, a wired connection may employ a serial transmission protocol, and a wireless connection may employ an 802.11 protocol to transmit commands and receive inspection data. The external system interface allows the inspection system to send data to and receive data from external systems via a wired or wireless connection.

To inspect a target, an inspector would typically interact with the inspection main unit to initialize the inspection. An inspection plan (or scan plan) may have been previously loaded into the memory unit of the inspection system. The inspection program may implement the inspection plan by providing instructions to the inspector, such as which portion of the target to scan (e.g., move the inspection probe across), the scan speed, the angle at which to hold the inspection probe, redo instructions, and so on. If the inspection main unit cannot be carried by the inspector while scanning, then the inspector would position the inspection main unit at a convenient location and then walk over to the portion of the inspection target to be scanned and start scanning. The inspector, however, may need to walk back to the inspection main unit as needed to obtain further instructions, to verify that the inspection is proceeding correctly, to input data such as scan area and position data, and so on. The inspector typically needs to input position data, because PAUT units in general do not collect position data such as the location or orientation of the inspection probe during a scan. If the inspection probe is wired to the inspection main unit (or if it is wireless and out of range) or if the inspector needs to see the display of the inspection main unit while scanning, then the inspector may need to move the inspection main unit frequently.

The process of moving back and forth between the scan location and the inspection main unit and the moving of the inspection main unit can be hazardous, time-consuming, and costly. Such moving back and forth can be hazardous, for example, if the inspector needs to climb a ladder or stand on a scaffold to scan while the inspection main unit is located on the ground, and the inspector is at risk of a misstep or getting tangled if the inspection probe is wired. Alternatively, two inspectors could be employed, with one scanning with the inspection probe and the other interacting with and moving the inspection main unit. Indeed, some governmental regulatory authorities (e.g., aviation authorities) currently require two inspectors for safety reasons. Although the inspection may be safer with two inspectors, the inspection can be costlier overall because the faster speed of the inspection would typically not be enough to offset the cost of the additional inspector.

DETAILED DESCRIPTION

Figure 1:
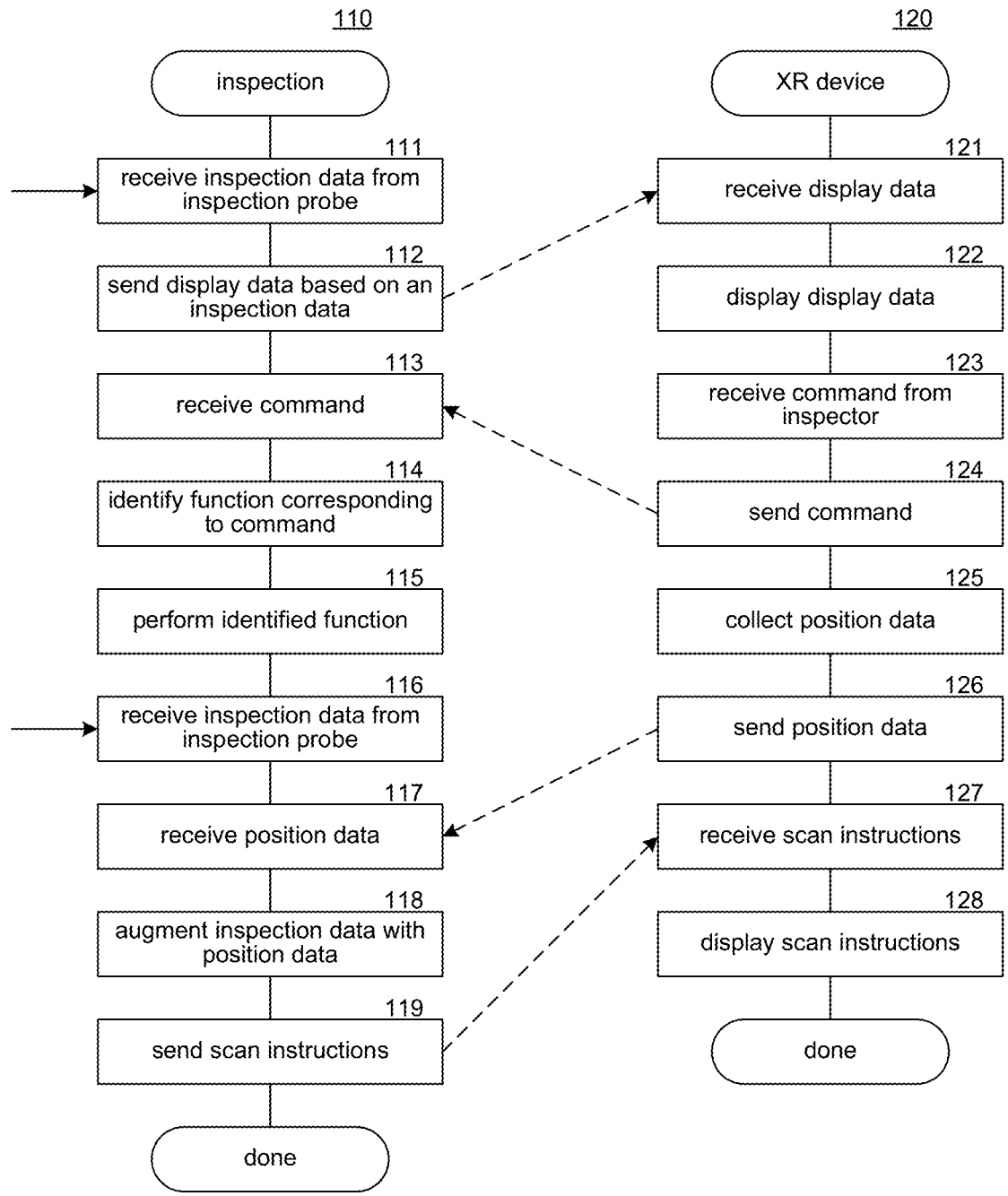
FIG. 1 illustrates flow diagrams of the XR inspection system in some embodiments.

Methods and systems are provided for integrating an extended reality ("XR") device with an inspection system for inspecting targets. In some embodiments, an XR inspection system includes an inspection system, an XR inspection controller, and an XR device. The XR device may be a virtual reality device, an augmented reality device, or other type of device that can be worn by an inspector for displaying data of and receiving input for the XR inspection system. The inspection system may be a conventional inspection system that has been adapted to interface with the XR device. The XR inspection controller interfaces with the inspection system and the XR device to support the use of the XR device as an input/output device of the XR inspection system. The XR inspection controller may be implemented on the inspection main unit, a separate computing device, or the XR device, or it may have some functions implemented on the inspection main unit, a separate computing device, and the XR device. The XR inspection system allows an inspector to conduct an inspection more efficiently and more safely than with a conventional inspection system. For example, the inspector can view both the target and related information via the XR device without having to repeatedly move the inspection main unit so that the display of the inspection main unit is visible. In addition, the inspector can input commands via the XR device, which are sent to the XR inspection controller to direct the inspection system to perform various functions. In this way, the inspector avoids having to access the inspection main unit directly when conducting an inspection.

In some embodiments, the inspection system includes an inspection main unit and an inspection probe. The inspection main unit includes an inspection probe interface for interfacing with the inspection probe and a controller interface for interfacing with the XR inspection controller. The XR inspection controller includes an XR interface for interfacing with the XR device. The inspection main unit collects inspection data from the inspection probe via the inspection probe interface and performs functions as directed by the XR inspection controller. The XR inspection controller receives commands and other data input via the XR device, stores the data, identifies functions of the inspection main unit to implement the commands, directs the inspection main unit to perform identified functions associated with the commands, receives display data from the inspection main unit and generates display data, and sends display data to the XR device. For example, a command may indicate to perform a certain function of the inspection system, such as to adjust the gain of an output signal, and the other data may be the current position of the inspection probe. The display data may include, for example, information on characteristics of the target, such as information on a potential problem with the target (e.g., a flaw detected), a graphical depiction of how to hold and move the instruction probe, or instructions on how the inspector should manipulate (e.g., move and orient) the inspection probe.

In some embodiments, the XR device includes a display and sensors. The XR device displays data received from the XR inspection controller, receives commands via the sensors from the inspector, receives data from the sensors, and sends the commands and data to the XR inspection controller. The XR inspection controller may identify, via the sensors, position data (e.g., location and orientation) associated with the inspection probe. For example, the location of the inspection probe may be identified by processing images collected by a camera of the XR device (e.g., via recognition of a hand, the inspection probe, or a tag affixed to the inspection probe), ranging data received via the sensors, signals transmitted by the inspection probe (e.g., via an active tag affixed to the inspection probe), and so on. The XR inspection controller may identify commands of the inspector based on hand gesture recognition, voice recognition, gaze recognition (e.g., staring at an option), and so on. The XR device may collect audio from the inspector that, for example, may be sent to the XR inspection controller as annotations for the inspection.

The XR inspection system thus allows integration of an XR device with an inspection system to improve the inspection process. The XR inspection system incorporates display data from the inspection system to provide an improved user experience via the XR device. The XR inspection system allows remote control of the inspection system through commands received from the inspector via the XR device and sent to the inspection system to perform various operations (or functions) of the inspection system. The XR inspection system augments data collected from the inspection probe with data (e.g., position data) collected by the XR device. By augmenting the data, the XR inspection system supports analyses and other processing that could not otherwise be performed. For example, the use of accurate location data provided by the XR device can be used by the inspection controller to provide more detailed instructions for manipulating the inspection probe, such as where to rescan and to change the scan speed. The augmented data can be used to provide reliable location data for the inspection data and to make it more easily comprehensible. For example, the augmented data can be used to generate a 3D model of the target in which problem areas can be identified and shown to the inspector during inspection or to other personnel after the inspection (or even during the inspection if the inspection system can transmit the augmented data to another computer system in real time).

In some embodiments, the XR inspection system allows an inspector to view both the target and output of the inspection main unit simultaneously, reducing the delay and possibility for error introduced by requiring the inspector to constantly switch between looking at the inspection probe and the display of the inspection main unit. Similarly, since the inspector can control the inspection main unit remotely, the inspector is able to concentrate on interacting with the inspection probe and target, resulting in improved scanning results.

Although described primarily in the context of inspecting components of a system using an inspection system that is a PAUT unit, the XR inspection system can be used for other types of inspections using different types of inspection systems. For example, the XR inspection system may be used for inspecting baggage at a security checkpoint, such as at an airport or a government building. In such a case, the XR inspection system may or may not include an inspection probe. When an inspector inspects a bag, a previously taken X-ray image of the bag may be displayed on the XR device to guide the inspection. If a 3D image (e.g., via a CT scan) of the bag was collected, then the inspector may interact with the XR device to rotate the image to guide the inspection. Additional information may be displayed on the display of the XR device, such as suspected identification of the item (e.g., hand gun, liquid container, or pressurized canister). Also, a remotely located supervisory inspector may be presented a video of what the inspector is seeing and provide instructions that are presented to the inspector via the display or speaker of the XR device. The XR inspection system may be used to inspect the items within various types of containers, such as cargo containers, transportation trailers, mail parcels, and so on.

FIG. 1 illustrates flow diagrams of the XR inspection system in some embodiments. In this embodiment, the inspection component 110 controls the processing of data received by the inspection main unit from the inspection probe and XR device. The XR device component 120 controls the XR device based on data received from the inspection component. The inspection component may be implemented as part of the inspection main unit or implemented on a separate computer system that interfaces with the inspection main unit. The manufacturer of the inspection system may provide a software development kit ("SDK") to facilitate developing applications to execute on the inspection main unit. The manufacturer may also provide an application programming interface ("API") through which a separate computer system can send data to and retrieve data from the inspection system, change settings of the inspection system, invoke procedures of the inspection system, and so on. The XR device component may be implemented as part of the XR device.

In block 111, the inspection component receives inspection data collected via the inspection probe. In block 112, the inspection component generates display data based on the received inspection data and sends the display data to the XR device component. For example, the display data may include scan instructions, alerts, and so on. In block 121, the XR device component receives the display data. In block 122, the XR device component directs the XR device to display the display data, for example, so that is visible in an augmented reality manner. In block 123, the XR device component may receive a command from the inspector. For example, the command may be to adjust a parameter for the scanning, to send a next instruction, to indicate a rescan, and so on. In block 124, the XR device component sends the command to the inspection component. In block 113, the inspection component receives the command. In block 114, the inspection component identifies the function corresponding to the command. For example, a separate function of the XR inspection controller or inspection main unit may be defined for each command that is to be invoked when that command is received. As such, the functions can be of arbitrary complexity. In block 115, the inspection component directs the identified function to be performed, for example, by invoking a function of the XR inspection controller or of the application programming interface of the inspection main unit. In block 116, the inspection component may receive additional inspection data from the inspection probe. In block 125, the XR device component may at the same time collect position data indicating the position of the inspection probe. In block 126, the XR device component sends the position data to the inspection component. In block 117, the inspection component receives the position data. In block 118, the inspection component augments the inspection data with the position data. For example, the position data may indicate the angle at which the inspection probe was held during the collection of the most recent inspection data. In block 119, the inspection component may generate and send scan instructions based on the augmented inspection data and then completes. In block 127, the XR device component receives the scan instructions. In block 128, the XR device component directs the XR device to display the scan instructions and completes.

Figure 2A:
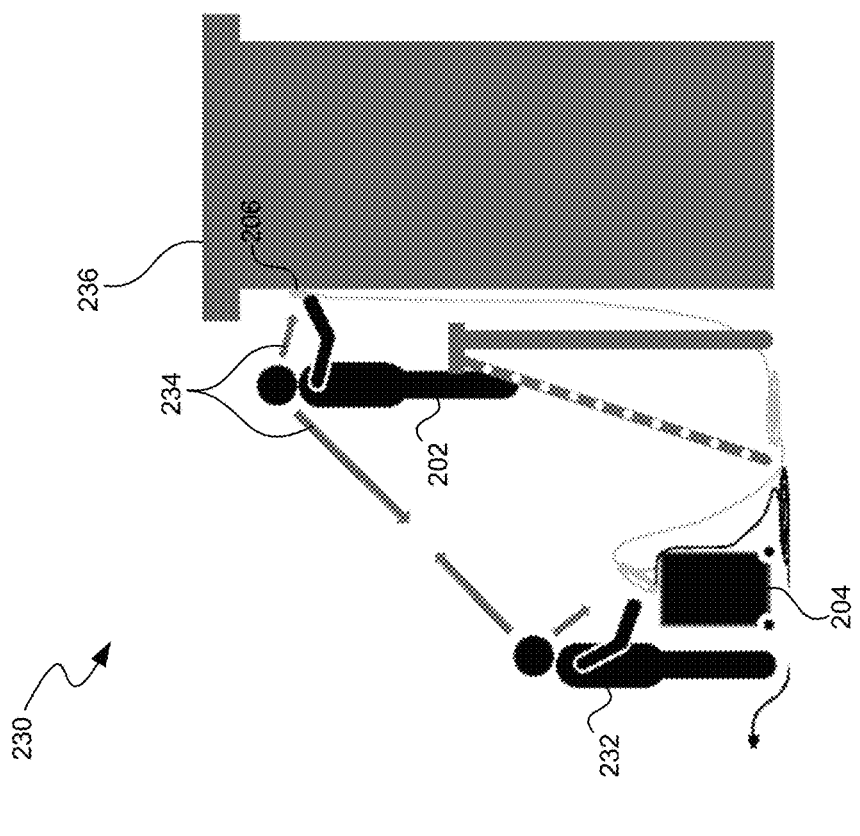
FIG. 2A illustrates examples of conventional methods for performing an inspection with an inspection system.
Figure 2A:
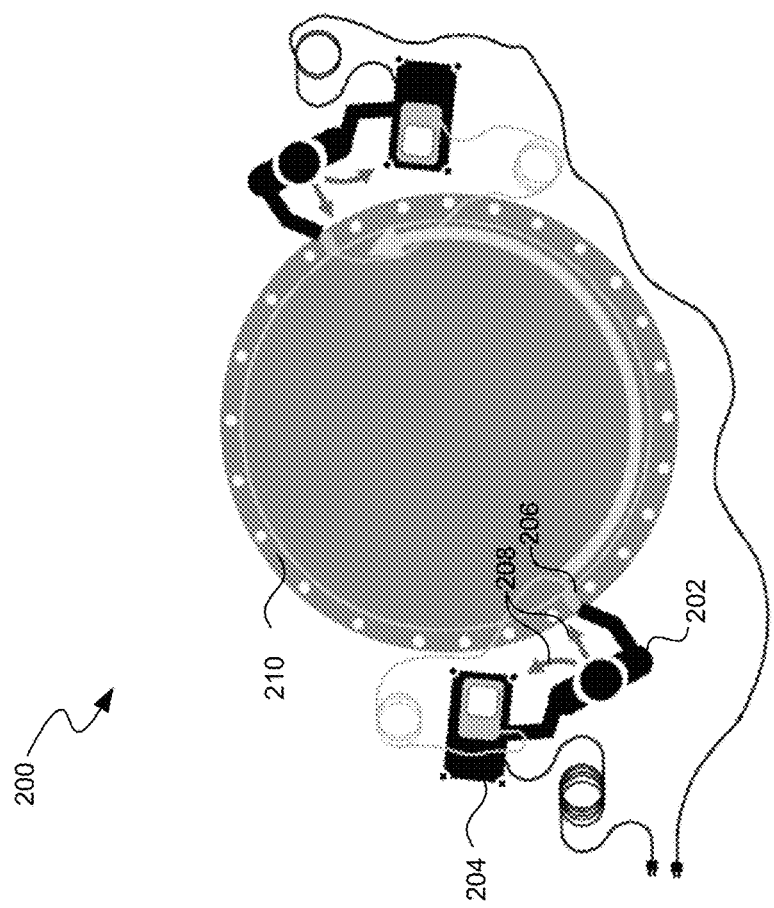

FIG. 2A illustrates examples of conventional methods for performing an inspection with an inspection system. In example 200, an inspector 202 moves around a target 210, scanning the target with inspection probe 206. The inspection data collected by the inspection probe is sent to the inspection main unit 204. During the inspection, the inspector repeatedly looks 208 at the target and then looks 208 at the display of the inspection main unit. This looking back and forth repeatedly can cause the inspector to incorrectly manipulate the inspection probe, which can result in inspection errors. Also, the inspector needs to repeatedly move the inspection main unit to ensure that its display is in view.

In example 230, the inspector 202 climbs a ladder to scan a target 236. The inspector is, however, unable to view the display of inspection main unit. For example, the inspection main unit may be too far away (e.g., because of a tall ladder), or the repeated climbing up the ladder or turning the head 234 may be too dangerous or would introduce scanning errors. As a result, a second inspector 232 is employed to view the display of inspection main unit 204 and relay instructions to the other inspector. The use of two inspectors presents some problems such as increased costs, possibility of miscommunications, and so on.

Figure 2B:
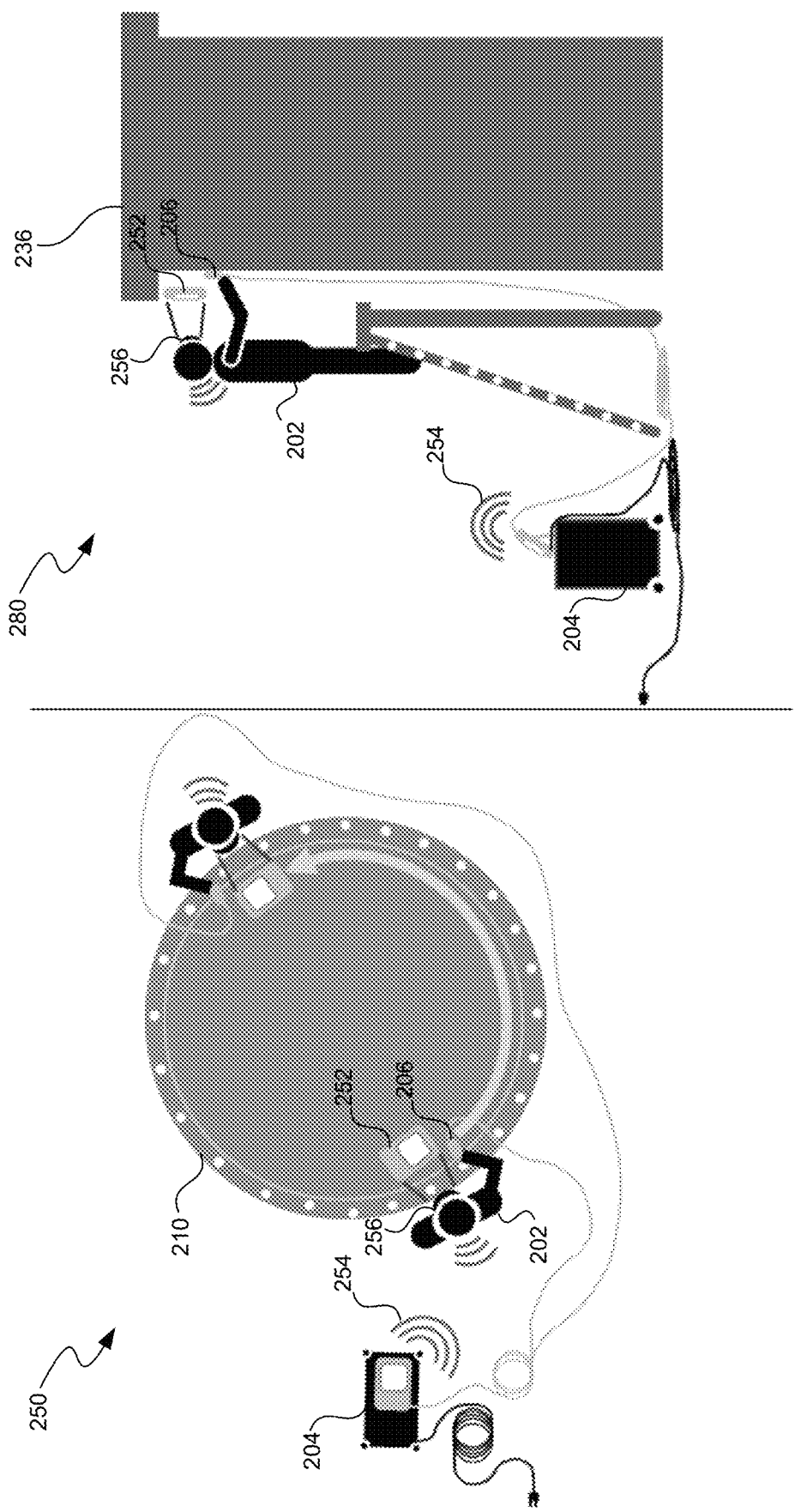
FIG. 2B illustrates examples of improved methods for performing an inspection using the XR inspection system.

FIG. 2B illustrates examples of improved methods for performing an inspection using the XR inspection system. In example 250, an inspector 202 wearing an XR device 256 moves around a target 210, scanning the target with the inspection probe 206. The inspection main unit 204 (implementing some functions of the XR inspection controller) sends display data to the XR device, and the XR device (implementing some functions of the XR inspection controller) sends data to the inspection main unit. The inspection main unit and the XR device are connected via wireless communication channel 254. The XR device may provide an augmented reality "hologram" 252 experience to the inspector. In addition, the inspector can provide oral or gesture commands to the XR device to be sent to the inspection main unit. The use of the XR inspection system thus allows the inspector to perform the scan without having to repeatedly look back and forth between the target and the display of the inspection system. In addition, the inspector does not need to move the inspection system to keep it in view. Moreover, in some cases, the XR inspection system may allow the inspection main unit to support multiple inspection probes and XR devices so that the cost of purchasing multiple inspection main units can be avoided.

In example 280, the inspector 202 climbs a ladder to scan the target 236. The inspector can view output from the inspection main unit 204 via the XR device 256 and send commands to the inspection main unit via the XR device. This allows a single inspector to scan the target without having to look at the display of the inspection main unit and without having to repeatedly climb up and down the ladder.

Figure 3:
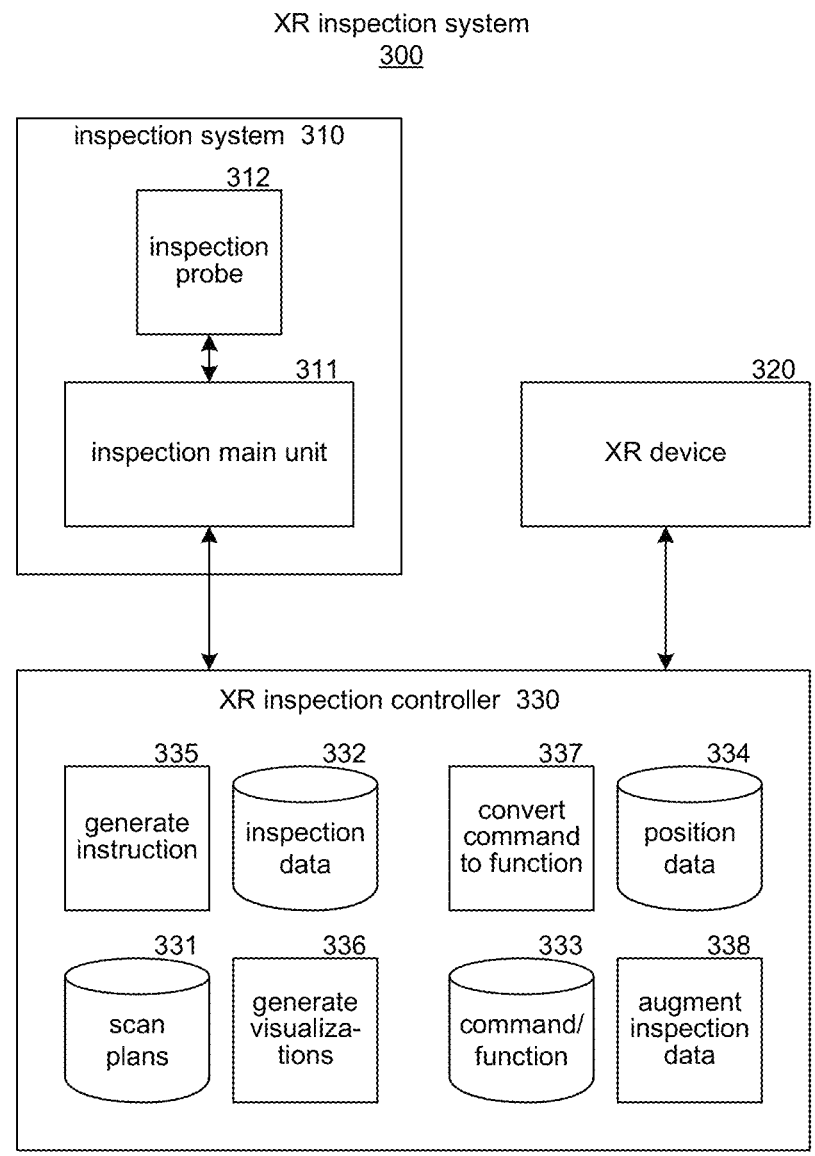
FIG. 3 is a block diagram that illustrates components of an XR inspection system in some embodiments.

FIG. 3 is a block diagram that illustrates components of an XR inspection system in some embodiments. The XR inspection system 300 includes an inspection system 310, an XR device 320, and an XR inspection controller 330. The XR inspection system controller 330 may be implemented as part of the inspection system and the XR device or may be implemented by a computing system that interfaces with both the inspection system and the XR device. Some of the functions described as being part of the XR inspection controller may be implemented on the inspection main unit as provided by the manufacturer. The inspection system includes an inspection main unit 311 and an inspection probe 312. The XR inspection controller includes a scan plan data storage 331, an inspection data storage 332, a command/function storage 333, and a position data storage 334. The scan plan storage contains a scan plan for the current scan of a target. The inspection data storage contains inspection data that is received from the inspection system in real time. The command/function storage contains a mapping of the commands to the corresponding functions to be invoked. The position data storage contains position data generated by the XR device. The XR inspection controller also includes a generate instruction component 335, a generate visualizations component 336, a convert command to function component 337, and an augment inspection data component 338. The generate instruction component is invoked to generate instructions to send to the XR device as display data. For example, the instructions may be generated based on the current position that is being scanned, the orientation of the inspection probe, and so on. The generate visualizations component generates display data for certain types of visualizations to be provided to the XR device. For example, the display data may include information on an alert relating to the current location being scanned An alert may, for example, tell the user to pay particular attention to the current location because a prior scan identified a suspect condition that needed further review, to rescan an area, to slow down the scanning, and so on. The convert command to function component identifies the function associated with a command that has been received from the XR device and controls the invoking of that function. The function may be performed by the inspection main unit, the XR inspection controller, or the XR device. The augment inspection data component augments the inspection data received from the inspection system with position data received from the XR device.

In some embodiments, the XR inspection system may collect the content of the display of the inspection main unit and send the content for display on the XR device for mirroring on the XR device. To collect the content of the display, video output of the inspection main unit may be routed to a screen grabber that provides the screens to the XR inspection controller. For example, with an OmniScan PAUT unit provided by Olympus, the super video graphics array ("SVGA") video output may be routed to a video graphics array ("VGA") video grabber, such as an AV.io HD external video capture device. The VGA grabber converts the VGA video into a stream that is sent to a universal serial bus ("USB") port to the XR inspection controller. The XR inspection controller then mirrors the stream onto the XR device via a wireless connection.

The computing systems (e.g., network nodes or collections of network nodes) on which the XR inspection system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the XR inspection system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. Suitable XR devices include augmented reality devices such as Microsoft HoloLens, Google Glass, Intel Vaunt, and Magic Leap Lightwear, virtual reality devices such as Facebook Oculus, Samsung VR, Google Cardboard, and HTC Vive, and devices such as a projected head-up display. Suitable inspection systems include PAUT devices of Olympus and General Electric. A VR device may include a camera to collect a video of what the inspector would be looking at and present that video as part of the display data.

The XR inspection system may be described in the general context of computer-executable instructions, such as program modules and components, executed by one or more computers, processors, or other devices. Generally, program modules or components include routines, programs, objects, data structures, and so on that perform tasks or implement data types of the XR inspection system. Typically, the functionality of the program modules may be combined or distributed as desired in various examples. Aspects of the XR inspection system may be implemented in hardware using, for example, an application-specific integrated circuit ("ASIC") or field programmable gate array ("FPGA").

Figure 4:
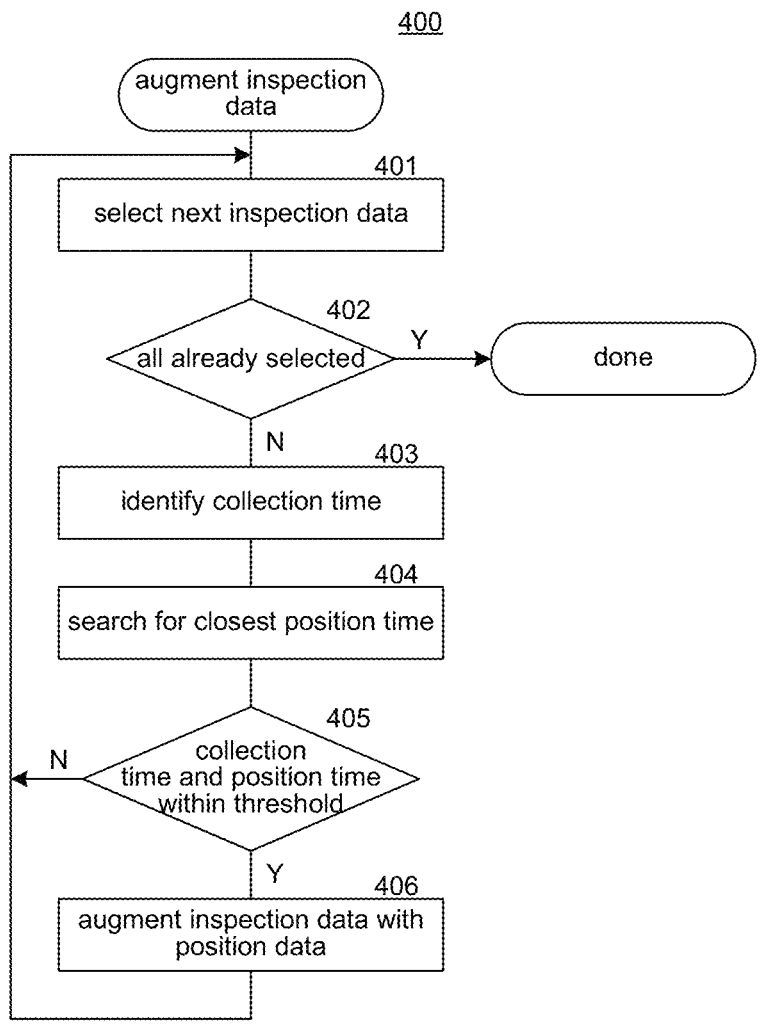
FIG. 4 is a flow diagram that illustrates the processing of an augment inspection data component of the XR inspection system in some embodiments.

FIG. 4 is a flow diagram that illustrates the processing of an augment inspection data component of the XR inspection system in some embodiments. The augment inspection data component 400 may be invoked periodically to augment inspection data received from the inspection system. In block 401, the component selects the next inspection data that has not yet been processed. In decision block 402, if all the inspection data has already been processed, then the component completes, else the component continues at block 403. In block 403, the component identifies a collection time at which the inspection data was collected. In block 404, the component searches for the closest position time in the position data received from the XR device. In decision block 405, if the collection time and the closest position time are within a certain threshold, then the component continues at block 406, else the component loops to block 401 to select the next inspection data. In block 406, the component augments the inspection data with the position data of the closest position time and then loops to block 401 to select the next inspection data. In some embodiments, the component may perform various interpolations and extrapolations based on the position data associated with the closest position times to arrive at the calculated position data for the inspection data.

Figure 5:
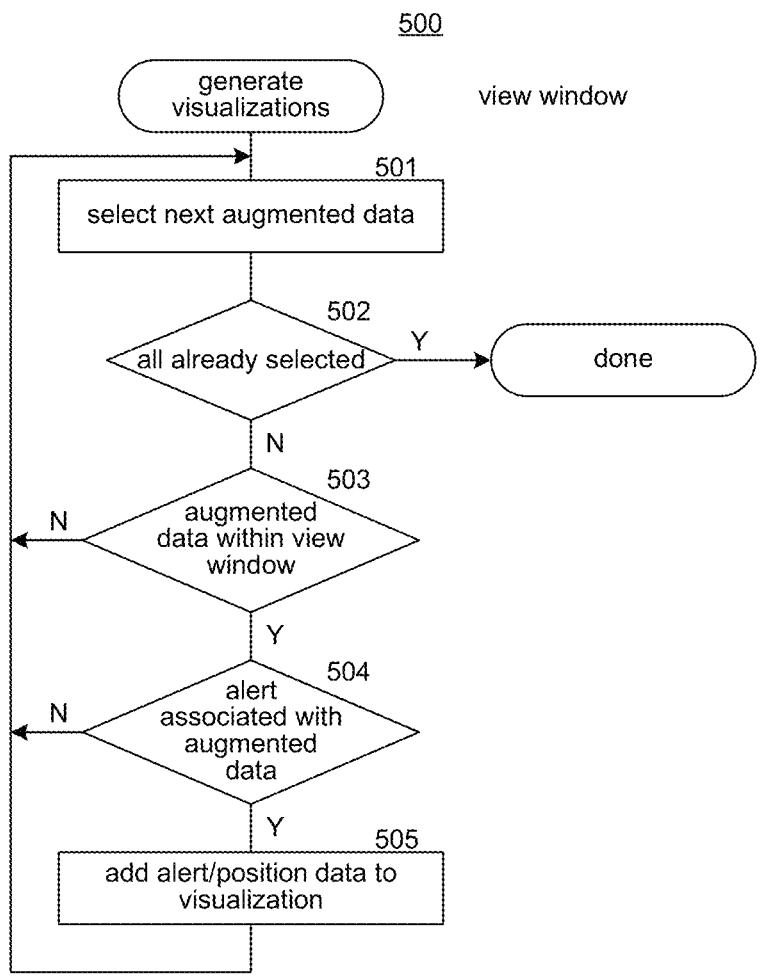
FIG. 5 is a flow diagram that illustrates the processing of a generate visualizations component of the XR inspection system in some embodiments.

FIG. 5 is a flow diagram that illustrates the processing of a generate visualizations component of the XR inspection system in some embodiments. The generate visualizations component 500 is invoked, passing an indication of a view window specifying the portion of the target that is in view of the inspector. The component identifies display data that is appropriate for the view window. In block 501, the component selects the next augmented data. In decision block 502, if all the augmented data has already been selected, then the component completes, else the component continues at block 503. In decision block 503, if the augmented data is within the view window, then the component continues at block 504, else the component loops to block 501 to select the next augmented data. In decision block 504, if an alert is associated with the augmented data, then the component continues at block 505, else the component loops to block 501 to select the next augmented data. In block 505, the component adds the alert and position data to the visualization and then loops to block 501 to select the next augmented data. The XR inspection system may also perform similar generations of visualizations for scan notes, scan instructions, and so on.

Figure 6:
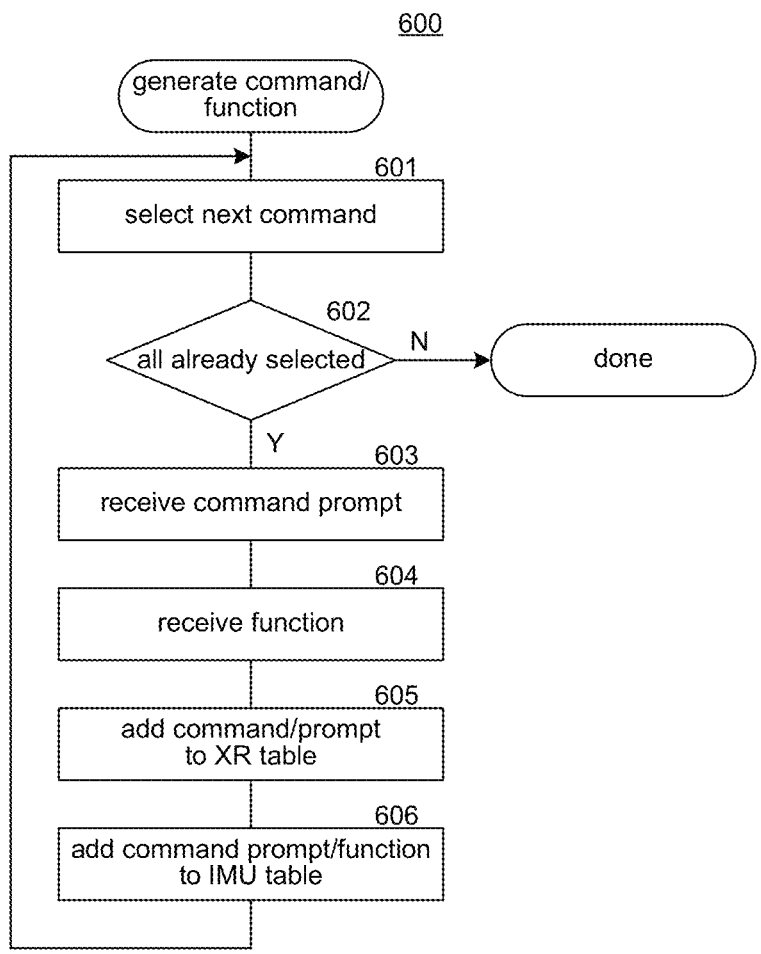
FIG. 6 is a flow diagram that illustrates the processing of a generate command/function component of the XR inspection system in some embodiments.

FIG. 6 is a flow diagram that illustrates the processing of a generate command/function component of the XR inspection system in some embodiments. A generate command/function component 600 may be provided to allow an inspector to customize the inspector's user experience. The component may provide a user interface through which the inspector can indicate which commands are associated with which functions. In block 601, the component selects the next command. In decision block 602, if all the commands have already been selected, then the component completes, else the component continues at block 603. In block 603, the component receives a command prompt from the inspector. For example, the command prompt identifies a certain gesture or a certain word to be input by the inspector. In block 604, the component receives the identification of the function to be invoked when the command prompt is recognized. In block 605, the component adds a mapping of the command to the command prompt to an XR command table for the XR device. The XR command table contains a mapping of commands to command prompts. In block 606, the component adds the command prompt to function mapping to an inspection main unit command table and then loops to block 601 to select the next command. The inspection main unit command table contains a mapping of commands to functions.

The following paragraphs describe various embodiments of aspects of the XR inspection system. An implementation of the XR inspection system may employ any combination of the embodiments. The processing described below may be performed by a computing system with a processor that executes computer-executable instructions stored on a computer-readable storage medium that implements the XR inspection system.

In some embodiments, a method performed by an extended reality inspection system for integrating an inspection system with an XR device is provided. The XR device is used by an inspector conducting an inspection of a target with an inspection probe of the inspection system. The method receives inspection data of the target collected by the inspection probe and receives position data provided by the XR device. The method stores a mapping of the inspection data to the position data corresponding to the position of the inspection probe when the inspection data was collected. The method generates display data. The method sends the display data to the XR device for display by the XR device. The method receives from the XR device a command provided by the inspector to perform a function of the inspection system. In response to receiving the command, the method performs the function by the inspection system. In some embodiments, the method stores a mapping of commands to functions of the inspection system and, when the command is received, identifies a function to which the command is mapped. In some embodiments, the position data includes a location of the inspection probe. In some embodiments, the position data includes an orientation of the inspection probe. In some embodiments, the method analyzes the inspection data to identify a characteristic of the target and wherein the display data includes a visualization of the identified characteristic of the target. In some embodiments, the display data is displayed by the XR device so that the visualization of the identified characteristic is displayed to appear on the target at a location associated with the identified characteristic. In some embodiments, the display data includes instructions for conducting the inspection of the target. In some embodiments, the display data includes data that is displayed on a display of the inspection system. In some embodiments, the display data includes data derived from the inspection data. In some embodiments, the inspection data is associated with a collection time and the position data is associated with a position time and wherein the inspection data is mapped to the position data based on the collection time and the position time.

In some embodiments, a method performed by an extended reality inspection system that includes an inspection system and an XR device is provided. The XR device is used by an inspector during an inspection of a target. The inspector performs the inspection using an inspection probe of the inspection system. The method receives display data from the inspection system and directs the XR device to display data derived from the display data so that it is visible to the inspector. The method identifies position data of the inspection probe at a position time based on analysis of data received by sensors of the XR device. The method provides the position data and the position time of the inspection probe so that the position data can be associated with inspection data collected by the inspection system based on the position time of the position data and a collection time at which the inspection data was collected. In some embodiments, the display data is associated with a location on the target and the display data is displayed so that it is visible to the inspector when the inspector is viewing the location on the target. In some embodiments, the display data relates to a characteristic of the target at the location. In some embodiments, the position data includes location of the inspection probe based on location of a hand of the inspector holding the inspection probe. In some embodiments, the position data includes location of the inspection probe based on a tag affixed to the inspection probe. In some embodiments, the method further receives a command from the inspector and sends the command to the inspection system. In some embodiments, the command is received based on a gesture performed by the inspector. In some embodiments, the command is received as a voice command from the inspector. In some embodiments, the display data includes instructions for performing the inspection. In some embodiments, the display data includes a graphical depiction of how to manipulate the inspection probe. In some embodiments, the instructions are based on analysis of how the inspector is currently manipulating the inspection probe.

In some embodiments, an extended reality inspection system for inspecting a target is provided. The system comprises an inspection system, an XR inspection controller, and an XR device. The inspection system includes an inspection main unit and an inspection probe. The inspection main unit has a processor, a memory unit, and an inspection probe interface. The memory unit stores instructions for controlling the inspection main unit to collect inspection data from the inspection probe via the inspection probe interface, to receive from the XR inspection controller an identification of functions to perform, to perform those functions, and to send to the XR inspection controller display data for display on the XR device. The XR device has an augmented reality display and sensors and is adapted to display display data sent from the XR inspection controller, receive input from an inspector, and send data derived from the received input to the XR inspection controller. The XR inspection controller receives display data from the inspection main unit, sends display data to the XR device, receives input from the XR device, identifies a command indicated by the input, and directs the inspection main unit to perform a function associated with the identified command. In some embodiments, the XR device is further adapted to collect position data associated with the inspection probe and send the position data to the XR inspection controller. In some embodiments, the XR inspection controller maps inspection data to corresponding position data. In some embodiments, the inspection data is mapped to corresponding position data based on time of collection of the inspection data and time of collection of the position data. In some embodiments, the display data includes an indication of a characteristic of the target that is displayed in association with a location of the target that is associated with the characteristic.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by an extended reality ("XR") inspection system for integrating an inspection system with an XR device, the XR device being used by an inspector conducting an inspection of a target with an inspection probe of the inspection system, the method comprising:
for each of a plurality of collection times, receiving inspection data of the target collected by the inspection probe at a time corresponding to that collection time;
for each of a plurality of position times, receiving position data provided by the XR device indicating a position of the inspection probe at a time corresponding to that position time, wherein the position data is collected by the XR device sending a signal to an active tag affixed to the inspection probe and collecting data transmitted from the active tag in response to the signal;
storing a mapping of the inspection data to the position data, the mapping representing position of the inspection probe when the inspection data was collected as indicated by the collection times and position times;
generating display data that includes data derived from the inspection data based on the mapping of inspection data to the position data and that includes an indication of an option to perform a command;
sending the display data to the XR device for display to the inspector by the XR device;
after the display data is displayed to the inspector, receiving from the XR device an indication to select the command, the command identified based on voice recognition or gaze recognition of the inspector gazing at the indication of the option to perform the command; and
in response to receiving the indication to select the command, performing by the inspection system a function associated with the command.

2. The method of claim 1 further comprising storing a mapping of commands to functions of the inspection system and, when the command is received, identifying a function to which the command is mapped.

3. The method of claim 1 wherein the position data includes an orientation of the inspection probe.

4. The method of claim 1 further comprising analyzing the inspection data to identify a characteristic of the target and wherein the display data includes a visualization of the identified characteristic of the target.

5. The method of claim 4 wherein the display data is displayed by the XR device so that the visualization of the identified characteristic is displayed to appear on the target at a location associated with the identified characteristic.

6. The method of claim 1 wherein the display data includes instructions for conducting the inspection of the target.

7. The method of claim 1 wherein the display data includes data that is collected from content for a display of the inspection system.

8. A method performed by an extended reality ("XR") inspection system that includes an inspection system and an XR device, the XR device used by an inspector during an inspection of a target, the inspector performing the inspection using an inspection probe of the inspection system, the method comprising:
receiving display data from the inspection system, the display data including content for display on a display of the inspection system;
directing the XR device to display data derived from the display data so that it is visible to the inspector;
for each of a plurality of position times, identifying position data of the inspection probe at a time corresponding to that position time based on analysis of data received by sensors of the XR device, wherein the position data is collected by the XR device sending a signal to an active tag affixed to the inspection probe and collecting data transmitted from the active tag in response to the signal;
providing the position data and the position time of the inspection probe so that the position data can be mapped to inspection data collected by the inspection probe as indicated by the position times of the position data and a plurality of collection times at which the inspection data was collected; and
receiving from the XR device an indication of a command that is identified based on voice recognition or gaze recognition of the inspector gazing at a displayed indication of an option to perform the command; and
sending the command to the inspection system so that processing associated with the command can be performed.

9. The method of claim 8 wherein the display data is associated with a location on the target and the display data is displayed so that it is visible to the inspector when the inspector is viewing the location on the target.

10. The method of claim 9 wherein the display data relates to a characteristic of the target at the location.

11. The method of claim 8 wherein the position data includes location of the inspection probe based on location of a hand of the inspector holding the inspection probe.

12. The method of claim 8 wherein a command is received based on a gesture performed by the inspector.

13. The method of claim 8 wherein a command is received as a voice command from the inspector.

14. The method of claim 8 wherein the display data includes instructions for performing the inspection.

15. The method of claim 14 wherein the display data includes a graphical depiction of how to manipulate the inspection probe.

16. The method of claim 14 wherein the instructions are based on analysis of how the inspector is currently manipulating the inspection probe.

17. One or more computing systems of an extended reality ("XR") inspection controller for controlling an inspection of a target, comprising:
one or more computer-readable storage mediums for storing computer-executable instructions for controlling the one or more computing systems to:
receive display data from an inspection system, the inspection system having an inspection probe;
direct an XR device worn by an inspector conducting the inspection to display data derived from the display data so that it is visible to the inspector;
receive from the XR device data generated based on sensors of the XR device;
for each of a plurality of position times, identify position data of the inspection probe at a time corresponding to that position time based on analysis of the received data, wherein the received position data is collected by the XR device sending a signal to an active tag affixed to the inspection probe and collecting data transmitted from the active tag in response to the signal; and
provide to the inspection system the position data and the position time of the inspection probe so that the position data can be mapped to inspection data collected by the inspection probe as indicated by the position times of the position data and a plurality of collection times at which the inspection data was collected by the inspection probe;
receive from the XR device a command identified by the XR device based on voice recognition or gaze recognition of the inspector gazing at a displayed indication of the command; and
send the command to the inspection system so that a function associated with the command can be performed; and
one or more processors for executing the computer-executable instructions stored in the one or more computer-readable storage mediums.

18. The one or more computing systems of claim 17 wherein the instructions include instructions to receive from the XR device a command identified by the XR device based on recognition of a hand gesture of the inspector and send the command to the inspection system.

19. The one or more computing systems of claim 17 wherein the instructions include instructions to receive from the XR device a command identified by the XR device based on voice recognition and send the command to the inspection system.

20. The one or more computing systems of claim 17 wherein the received data includes images of the inspection probe collected by a camera of the XR device and wherein the position data is identified from the images.

21. The one or more computing systems of claim 20 wherein the position data is identified based on recognition of a tag affixed to the inspection probe.

22. The one or more computing systems of claim 17 wherein the instructions receive from the XR device audio collected by the XR device from the inspector and send the audio to the inspection system as annotations for the inspection of the target.

23. The one or more computing systems of claim 17 wherein the XR device is adapted to be worn on the head of the inspector.

24. The one or more computing systems of claim 17 wherein the target is a container at a security checkpoint.

25. The one or more computing systems of claim 24 wherein the XR device is adapted to display a 3D image of the container collected via scan of the container and allow the inspector to rotate the 3D image to guide inspection of the container.

26. The one or more computing systems of claim 24 wherein the XR device is adapted to display a suspected identification of an item.

27. The one or more computing systems of claim 24 wherein the XR device is adapted to provided instructions of a supervisory inspector.

28. The one or more computing systems of claim 17 wherein the received data is ranging data.

29. The one or more computing systems of claim 17 wherein the instructions to receive display data include instructions to collect content for display on a display of the inspection system.

30. The one or more computing systems of claim 29 wherein the collected content is for mirroring content on the display of the inspection system on the XR device.

* * * * *